United States Patent
Kim et al.

(10) Patent No.: US 8,543,106 B2
(45) Date of Patent: Sep. 24, 2013

(54) SIGNAL TRANSMISSION MECHANISM WITH DIVERSITY GAIN IN SATELLITE COMMUNICATION NETWORK

(75) Inventors: Hee-Wook Kim, Seoul (KR); Kun-Seok Kang, Daejon (KR); Do-Seob Ahn, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 804 days.

(21) Appl. No.: 12/442,072

(22) PCT Filed: Dec. 11, 2006

(86) PCT No.: PCT/KR2006/005381
§ 371 (c)(1),
(2), (4) Date: Mar. 19, 2009

(87) PCT Pub. No.: WO2008/035835
PCT Pub. Date: Mar. 27, 2008

(65) Prior Publication Data
US 2010/0022238 A1    Jan. 28, 2010

(30) Foreign Application Priority Data
Sep. 21, 2006 (KR) .................. 10-2006-0091983

(51) Int. Cl.
*H04W 92/00* (2009.01)
(52) U.S. Cl.
USPC ............................. 455/427; 455/430; 725/62
(58) Field of Classification Search
USPC ........ 455/427, 428, 456.1, 12.1, 430; 725/62
See application file for complete search history.

(56) References Cited

U.S. PATENT DOCUMENTS

| | | | |
|---|---|---|---|
| 6,144,711 | A | 11/2000 | Raleigh et al. |
| 6,731,668 | B2 | 5/2004 | Ketchum |

(Continued)

FOREIGN PATENT DOCUMENTS

| | | |
|---|---|---|
| JP | 2006-229575 | 8/2006 |
| KR | 10-2005-0117172 | 12/2005 |
| KR | 10-2006-0016374 | 2/2006 |

OTHER PUBLICATIONS

Hee Wook Kim, et al., "Downlink Transmission Concept with Diversity Gain in SDMB System Including IMR", Communications Satellite Systems Conference (ICSSC—2006), Jun. 11-14, 2006.*
Christophe Selier, et al., "Satellite Digital Multimedia Broadcasting (SDMB) System Presentation", Proceedings of the 14$^{th}$ IST Mobile & Wireless Communications Summit, 2005 (3 pp).
Chaehag (Steve) Yi, "On Gap Filler Deployment in Satellite Digital Multimedia Broadcasting System E", Vehicular Technology Conference, IEEE, vol. 2, pp. 882-885, Sep. 2005.
Pasquale Pace, et al., "Cost model for evaluation of SDMB service over integrated satellite-terrestrial UMTS networks", IEEE, Wireless Communication System, pp. 667-671, Sep. 2005.

(Continued)

*Primary Examiner* — Kamran Afshar
*Assistant Examiner* — Khawar Iqbal
(74) *Attorney, Agent, or Firm* — Staas & Halsey LLP (57) ABSTRACT

Provided is a satellite communication system for obtaining a diversity gain by transmitting a signal applied with STBC. When a signal transmission band of a link between a satellite and a terminal differs from that of a link between a satellite and a repeater, the satellite communication system includes: a satellite for transmitting a first signal encoded to STBC using a band of a link formed between the satellite to a terminal and transmitting a second signal encoded to STBC using a band of a link formed between the satellite to a repeater; and at least one of frequency transforming repeaters for receiving the second signal through the band of the link formed between the satellite to the repeater, transforming the received second signal to a signal with other frequency band, and transmitting the transformed second signal using a band of a link formed to a terminal.

14 Claims, 6 Drawing Sheets

(56) References Cited

U.S. PATENT DOCUMENTS

| | | | |
|---|---|---|---|
| 7,719,465 B2* | 5/2010 | Son et al. | 342/357.31 |
| 7,917,135 B2* | 3/2011 | Karabinis | 455/427 |
| 8,078,101 B2* | 12/2011 | Karabinis et al. | 455/12.1 |
| 2001/0047503 A1 | 11/2001 | Zhang | |
| 2004/0192200 A1* | 9/2004 | Karabinis et al. | 455/12.1 |
| 2005/0265484 A1 | 12/2005 | Kim et al. | |
| 2006/0026650 A1* | 2/2006 | Kim et al. | 725/62 |
| 2006/0182193 A1 | 8/2006 | Monsen | |
| 2007/0184849 A1* | 8/2007 | Zheng | 455/456.1 |
| 2007/0204306 A1* | 8/2007 | Kim | 725/61 |
| 2008/0130769 A1* | 6/2008 | Papadopoulos et al. | 375/260 |
| 2008/0279135 A1* | 11/2008 | Periyalwar et al. | 370/315 |
| 2009/0154582 A1* | 6/2009 | Diao | 375/260 |
| 2010/0277318 A1* | 11/2010 | Maltseff | 340/572.1 |

OTHER PUBLICATIONS

Yeong-Wha Sawng, et al., "Market Acceptance for the Satellite DMB (Digital Multimedia Broadcasting) Service in Korea", IEEE, ICMB, pp. 413-419, 2005.

Hee Wook Kim, et al., "Downlink Transmission Concept with Diversity Gain in SDMB System Including IMR", Communications Satellite Systems Conference (ICSSC— 2006), Jun. 11-14, 2006.

International Search Report for International Application No. PCT/KR2006/005381, mailed May 29, 2007.

* cited by examiner

SIGNAL TRANSMISSION MECHANISM WITH DIVERSITY GAIN IN SATELLITE COMMUNICATION NETWORK

CROSS REFERENCE TO RELATED APPLICATIONS

This application claims the benefit under 35 U.S.C. Section 371, of PCT International Application No. PCT/KR2006/005381, filed Dec. 11, 2006, which claimed priority to Korean Application No. 10-2006-0091983, filed Sep. 21, 2006 in the Korean Intellectual Property Office, the disclosures of all of which are hereby incorporated by reference.

TECHNICAL FIELD

The present invention relates to a method of transmitting a signal from a satellite and a repeater in a satellite communication network and a method of receiving and processing signals from a satellite and a repeater at a terminal; and more particularly, to a satellite communication system for enabling a terminal to obtain diversity gain by transmitting a signal applied with a space time block code (STBC) through regarding a satellite and a repeater as two transmitting antennas, and a method for detecting a signal by performing STBC decoding on signals received from the satellite and the repeater regarded as two transmitting antennas and estimating a signal transmitting/receiving channel at the terminal.

BACKGROUND ART

The development of communication technology makes possible to provide various signals such as video, audio and data to users through a satellite although the users are moving around. In order to eliminate a shadow area in a satellite communication network, repeaters are installed at the ground.

The satellite digital multimedia broadcasting (DMB) in Republic of Korea and the satellite-digital multimedia broadcasting (S-DMB) in Europe are representative satellite communication system including repeaters. A repeater is defined as gap-filler in the satellite DMB of Republic of Korea, and a repeater is defined as an intermediate module repeater in the S-DMB of Europe. In a satellite communication network, a repeater is classified as a simple amplifying repeater and as a frequency transforming repeater. The simple amplifying repeater receives a signal from a satellite, amplifies the received signal in the same band, and relays the amplified signal to a terminal. The frequency transforming repeater transforms the frequency of the signals received from the satellite, and relays the transformed signals to a terminal.

In the terminal of the satellite communication network, multipath fading occurs to receive more than two signals. In order to stably receive the multi path fading signals, the terminal includes a CDMA rake receiver.

In the satellite communication network, a satellite simply radiates signals to the ground. A repeater simply amplifies a signal and relays the amplified signal, or transforms a signal to a signal with other frequency band and relays the transformed signal. Therefore, a terminal cannot obtain diversity gain through signals received from the satellite and from the repeaters.

For example, if a space time block code (STBC) defined in 3GPP WCDMA based IMT-2000 wireless interface specification is used, multipath fading can be reduced without requiring additional bandwidth in a multi antenna system, thereby obtaining diversity gain.

However, the STBC scheme cannot be applied to the conventional signal transmission scheme used in the satellite and the repeaters in the satellite communication network. That is, in order to apply the STBC scheme, a transmitting end is required to have two transmitting antennas and transmits time space block codes through the two transmitting antennas, and a terminal must be capable of obtaining time and space correlation of signals received from different antennas. Therefore, it is impossible to apply the STBC scheme into the conventional signal transmission scheme used in the satellite communication network.

Therefore, there is demand for a method to apply the space time block code (STBC) scheme into a satellite communication system without a gapfiller. Especially, there is demand for a method for obtaining diversity gain at a terminal by transmitting signal with STBC applied through reading a satellite and a repeater as two transmitting antennas, and a method for making a terminal to receive signals from a satellite and a repeater like receiving two signals from one transmitting end.

Furthermore, there is demand for a method for detecting a corresponding signal at a terminal by decoding a STBC coded signal received from a satellite and a repeater, and a method for improving efficiency of receiving a signal by performing channel estimation, channel compensation and channel prediction at a terminal.

DISCLOSURE OF INVENTION

Technical Problem

It is, therefore, an object of the present invention to a satellite communication system for enabling a terminal to obtain diversity gain by transmitting a signal applied with a space time block code (STBC) through regarding a satellite and a repeater as two transmitting antennas, and a method for detecting a signal by performing STBC decoding on signals received from the satellite and the repeater regarded as two transmitting antennas and estimating a signal transmitting/receiving channel at the terminal.

Technical Solution

In accordance with one aspect of the present invention, there is provided a satellite communication system for obtaining a diversity gain by transmitting a signal applied with a space and time block code (STBC) when a signal transmission band of a link between a satellite and a terminal differs from that of a link between a satellite and a repeater, including: a satellite for transmitting a first signal encoded to STBC using a band of a link formed between the satellite to a terminal and transmitting a second signal encoded to STBC using a band of a link formed between the satellite to a repeater; and at least one of frequency transforming repeaters for receiving the second signal through the band of the link formed between the satellite to the repeater, transforming the received second signal to a signal with other frequency band, and transmitting the transformed second signal using a band of a link formed to a terminal.

In accordance with another aspect of the present invention, there is provided a satellite communication system for obtaining a diversity gain by transmitting a signal applied with a space and time block code (STBC) when a signal transmission band of a link between a satellite and a terminal is identical to that of a link between a satellite and a repeater, including: a satellite for transmitting a first signal encoded to STBC using a band of a link formed between the satellite to a terminal and using a band of a link formed between the satellite to each repeater, respectively; and at least one of simple amplifying repeaters for receiving the first signal through the band of the link formed between the satellite and the repeater, transforming the received first signal to a second signal having the same frequency band of the first signal, and transmitting the transformed second signal using a band of a link formed to a terminal.

In accordance with still another aspect of the present invention, there is provided a satellite communication system for obtaining a diversity gain by transmitting a signal applied with a space and time block code (STBC) when a satellite communication network include repeaters having a simple amplifying function, including: a satellite for transmitting a first signal encoded to STBC using a band of a link formed between the satellite to a terminal and using a band of a link formed between the satellite to each repeater, respectively; at least one of first simple amplifying repeaters for receiving the first signal through the band of the link formed to the satellite, amplifying the received first signal, and transmitting the amplified first signal using a band of a link formed to a terminal; and at least one of second simple amplifying repeater for receiving the first signal through the band of the link formed to the satellite, transforming the first signal to a second signal having the same frequency band of the first signal, amplifying the transformed second signal, and transmitting the amplified second signal using a band of a link formed to a terminal.

In accordance with further still another embodiment of the present invention, there is provided a satellite communication system for obtaining a diversity gain by transmitting a signal applied with a space and time block code (STBC) when a satellite communication network include repeaters having a frequency transforming function and a signal transmission band of a link between a satellite and a terminal differs from that of a link between a satellite and a repeater, including: a satellite for transmitting a first signal encoded to STBC using a band of a link between the satellite to a terminal and transmitting a second signal that is encoded to STBC using a band of a link formed between the satellite to a repeater; at least one of first frequency transforming repeaters for receiving the second signal through the band of the link to the satellite, transforming the received second signal to a second signal having a frequency band corresponding to the link between the satellite and a terminal, and transmitting the transformed second signal using a band of a link formed to a terminal; and at least one of second frequency transforming repeater for receiving the second signal through the band of the link formed to the satellite, transforming the received second signal to a first signal having a frequency band corresponding to a link between the satellite and the terminal, and transmitting the transformed first signal using a band of a link formed to a terminal.

In accordance with yet another embodiment of the present invention, there is provided a method for detecting a signal in a terminal in a satellite communication system for obtaining a diversity gain by transmitting a signal applied with space time block code (STBC) from a satellite and a repeater to the terminal, the method including the steps of: estimating channel information corresponding to each received signal when receiving a signal encoded to STBC from a satellite and a repeater at the same time; generating a channel matrix using the estimated channel information; and detecting a transmitting signal by performing STBC decoding on the received signal based on STBC encoding information previously received from a satellite and a repeater and the generated channel matrix.

In accordance with yet another embodiment of the present invention, there is provided a method for estimating a channel in a terminal in a satellite communication system for obtaining a diversity gain by transmitting a signal applied with space time block code (STBC) from a satellite and a repeater to the terminal, the method including the steps of: estimating channel information value by performing a predetermined channel estimation scheme on signals received from a satellite and a repeater; delaying the estimated channel information value as much as D' applying to the delayed channel information value, and subtracting the result of applying the coefficient $\alpha$ from the estimated channel information value; and delaying the subtracted channel information value as much as D, applying to the delayed channel information value, and adding the result of applying the coefficient $\beta$ to the subtracted channel information value.

Advantageous Effects

According to the present invention, STBC can be applied to a satellite communication network by only modifying a signal transmission scheme using in a satellite and a repeater without additionally equipping new apparatus in a satellite communication system. Accordingly, temporal and spatial diversity gain can be obtained.

Also, a terminal is not required to include a new module or chip additionally to obtain a temporal and spatial diversity gain according to the present invention. Therefore, the cost of the terminal can be reduced.

Furthermore, channel estimation, compensation and prediction can be accurately performed even in a satellite communication network environment according to the present invention although the satellite communication network environment has a long round-trip delay time. Moreover, the load of terminal to perform the channel estimation can be reduced according to the present invention.

BRIEF DESCRIPTION OF THE DRAWINGS

The above and other objects and features of the present invention will become apparent from the following description of the preferred embodiments given in conjunction with the accompanying drawings, in which.

BEST MODE FOR CARRYING OUT THE INVENTION

Hereinafter, a repeater according to an embodiment of the present invention will be described in brief.

A frequency transforming repeater according to the present embodiment basically includes a frequency transforming function, and denotes a repeater selectively performing a signal processing function, for example, a signal transforming function, according to the environment of a satellite communication network. For example, the frequency transforming repeater according to an embodiment of the present invention transforms a signal $u_2$ received from a satellite to a signal $u_2$ with other frequency band without processing the received signal, and/or transforms a signal $u_1$ received from the satellite to a signal $u_2$ with the same frequency band of the signal $u_1$ by processing the received signal $u_1$.

Meanwhile, a simple amplifying repeater according to an embodiment of the present invention basically includes a signal amplifying function, and denotes a repeater selectively performing a signal processing function, for example, a signal transforming function, according to the environment of the satellite communication network. For example, the simple amplifying repeater amplifies a signal $u_1$ received from a satellite without processing the received signal and/or transforms the signal $u_1$ to a signal $u_2$ with the same frequency band of the signal $u_1$ by processing the received signal $u_1$.

Other objects and aspects of the invention will become apparent from the following description of the embodiments with reference to the accompanying drawings, which is set forth hereinafter.

Figure 1:
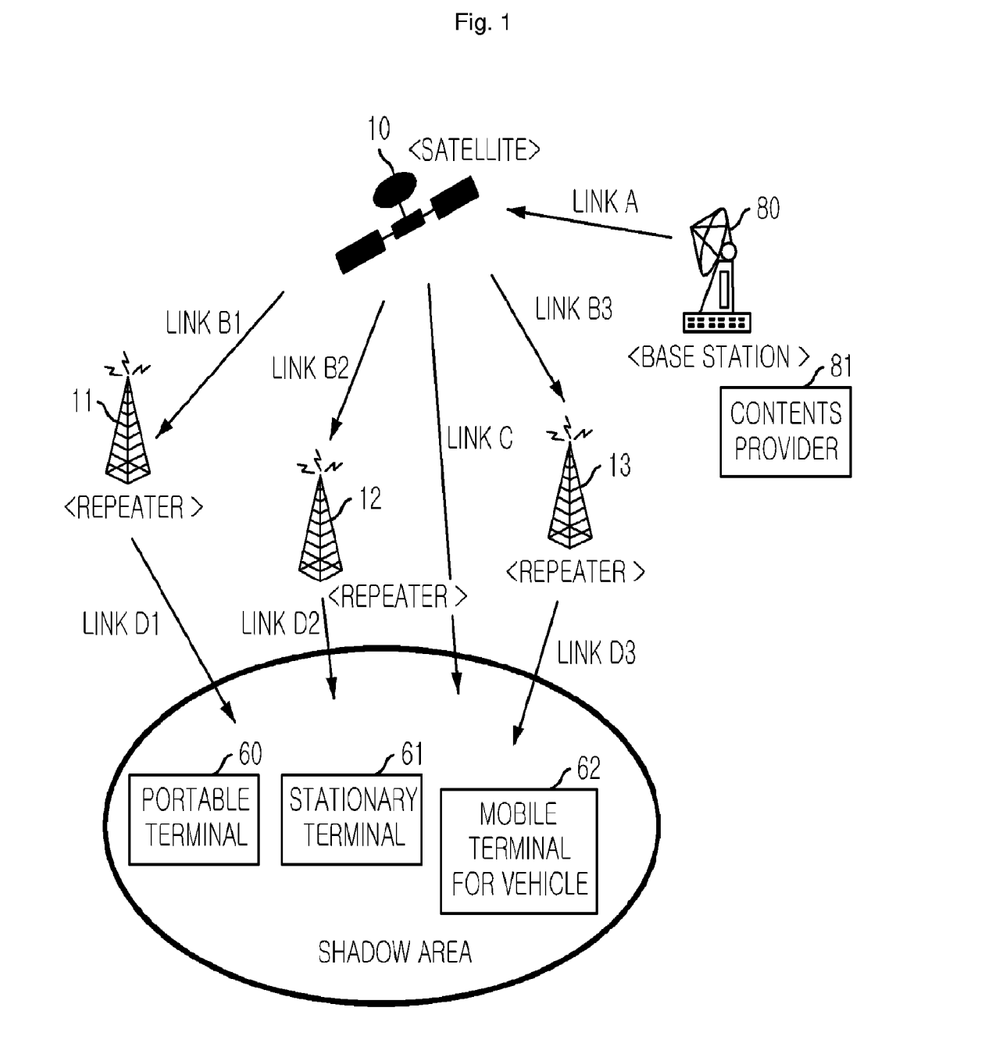
FIG. 1 is a diagram illustrating a satellite communication system in accordance with an embodiment of the present invention.

FIG. 1 is a diagram illustrating a satellite communication system in accordance with an embodiment of the present invention.

As shown in FIG. 1, the satellite communication system includes a satellite 10, repeaters 11 to 13, a base station 80, a contents provider CP 81 and a user terminal such as a portable terminal 60, a stationary terminal 61, and a mobile terminal 62. Hereinafter, the portable terminal 60 is used as the representative one of the user terminal to describe the satellite communication system.

In addition, the repeaters in the satellite communication network includes a simple amplifying repeater for simply amplifying a signal from a satellite and relaying the amplified signal to a terminal, and a frequency transforming repeater for transforming the frequency of a signal from a satellite and relaying the transformed signal to a predetermined terminal. The simple amplifying repeater and frequency transforming repeater are installed in consideration with a corresponding area of the communication environment. For example, the simple amplifying repeater is installed for covering a narrow area up to 500 m based on LOS, and the frequency transforming repeater is installed for covering a comparative wider area up to 3 Km.

The present invention provides a method of transmitting a signal at a satellite 10 and repeaters 11 to 13, and a method of receiving a signal at a satellite 10 and repeaters 11 to 13 in order to obtain spatial and temporal diversity gain form a signal received at a user terminal by applying a space time block code (STBC) scheme to a satellite communication system.

Hereinafter, how to transmit and receive a signal in a satellite communication network will be described with reference to FIG. 1 before describing embodiments of the present invention.

The base station 80 transforms contents data provided from the contents provider 81 to a signal proper for satellite communication, and transmits the transformed signal to the satellite 10. The satellite 10 transmits the signal directly to the portable terminal 60 or indirectly to the portable terminal through the repeaters 11 to 13.

As shown in FIG. 1, a link A denotes a link between the base station 80 and the satellite 1, and links B1, B2, and B3 denote links between the satellite 10 and the repeaters 11 to 13. A link C denotes a link between the satellite 10 and the portable terminal 60. Links D1, D2, and D3 denote links between the portable terminal and the repeaters 11 to 13. These links may be a bi-directional link or a one-directional link according to embodying specifications of a satellite communication system.

In a satellite digital multimedia broadcasting (DMB) defined in Republic of Korea as an example, the link A is a link with 14.11 GHz band, the links B1, B2, and B3 are links with 2.6 GHz band, and the links D1, D2, and D3 are links with 2.6 GHz band. In a S-DMB of Europe as another example, the link A is a link with HDFSS band from 19.6 to 20.2 GHz, the links B1, B2, and B3 are links with HDFSS band or satellite IMT-2000 band, and the links D1, D2, and D3 are links with a satellite IMT-2000 band.

As described above, the object of the present invention is to apply a STBC scheme to a satellite communication network in order to obtain a temporal and spatial diversity gain from signals received from the satellite 10 and from the repeaters 11 to 13 at the portable terminal 60.

Space time block code (STBC) is defined at 3GPP terrestrial WDCMA based IMT-2000 wireless interface specification, and is expected to be utilized in future IMT-2000 Advanced specification. Since the current technical specification of satellite communication system has commonality with the technical specification of terrestrial mobile communication system, the portable terminal 60 already employs the STBC scheme. Therefore, it is obvious to those skilled in the art that additional modules or chips are not required to be mounted in the portable terminal 60 to apply the STBC scheme into the satellite communication network according to the present invention.

The present invention may be applied to a satellite communication network including no repeaters. If a satellite transmits a signal encoded to STBC through a plurality of antennas without transmitting the STBC encoded signals through the repeaters, signals from the transmitting antennas have long round-trip delay times so each signal is not independently received. Therefore, no benefit is obtained by applying the STBC scheme in the satellite communication system dislike the terrestrial mobile communication system. Accordingly, a satellite communication network without repeaters is not discussed in the present invention.

As described above, the object of the present invention is to apply the STBC scheme into a satellite communication network because signals received from repeaters 11 to 13 at the mobile terminal 60 have independent characteristics.

In order to apply the STBC scheme into the satellite communication network, a transmitter must regard a satellite and repeaters as two transmitting antennas, and the satellite and the repeaters transmit signals encoded to STBC to a portable terminal. Since the portable terminal receives signals from the satellite and the repeaters, it requires the portable terminal processes the received signals like processing signals received from two transmitting antennas. Hereinafter, a method of transmitting a signal from a satellite and a repeater will be described with reference to FIGS. 2 to 4. That is, how to modify a signal transmission scheme in a satellite communication network will be described.

In order to apply the STBC scheme into a satellite communication network, a pilot signal or a channel estimation method is required for estimating a channel from two transmitting antennas to a receiving antenna. A portable terminal supporting the IMT-2000 and IMT-Advanced service already employs the STBC scheme. For example, the portable terminal uses a frame structure having a pilot signal or a well-known channel estimation method in order to estimate channels to two transmitting antennas. Therefore, it is obvious to those skilled in the art that the portable terminal will not have overhead although the STBC scheme is applied to the satellite communication network.

In order to apply the STBC scheme to a satellite communication network, a portable terminal needs to synchronize a signal received from a repeater with another signal received from a satellite. However, it is obvious to those skilled in the art that these signals can be easily synchronized by pre-compensating a signal from a satellite at a repeater in consideration with a process delay time for amplification and frequency transformation in order to allow a portable terminal to receive signals from the satellite and the repeater at the same time.

Hereinafter, a method of transmitting a signal at a satellite and a repeater according to the relation of a link between a satellite and a portable terminal, and between a satellite and a repeater for making a mobile terminal to receive the signals from the satellite and the repeaters like receiving signals from two transmitting antenna in order to apply the STBC scheme to a satellite communication network will be described with reference to FIGS. 2 to 4.

Figure 2:
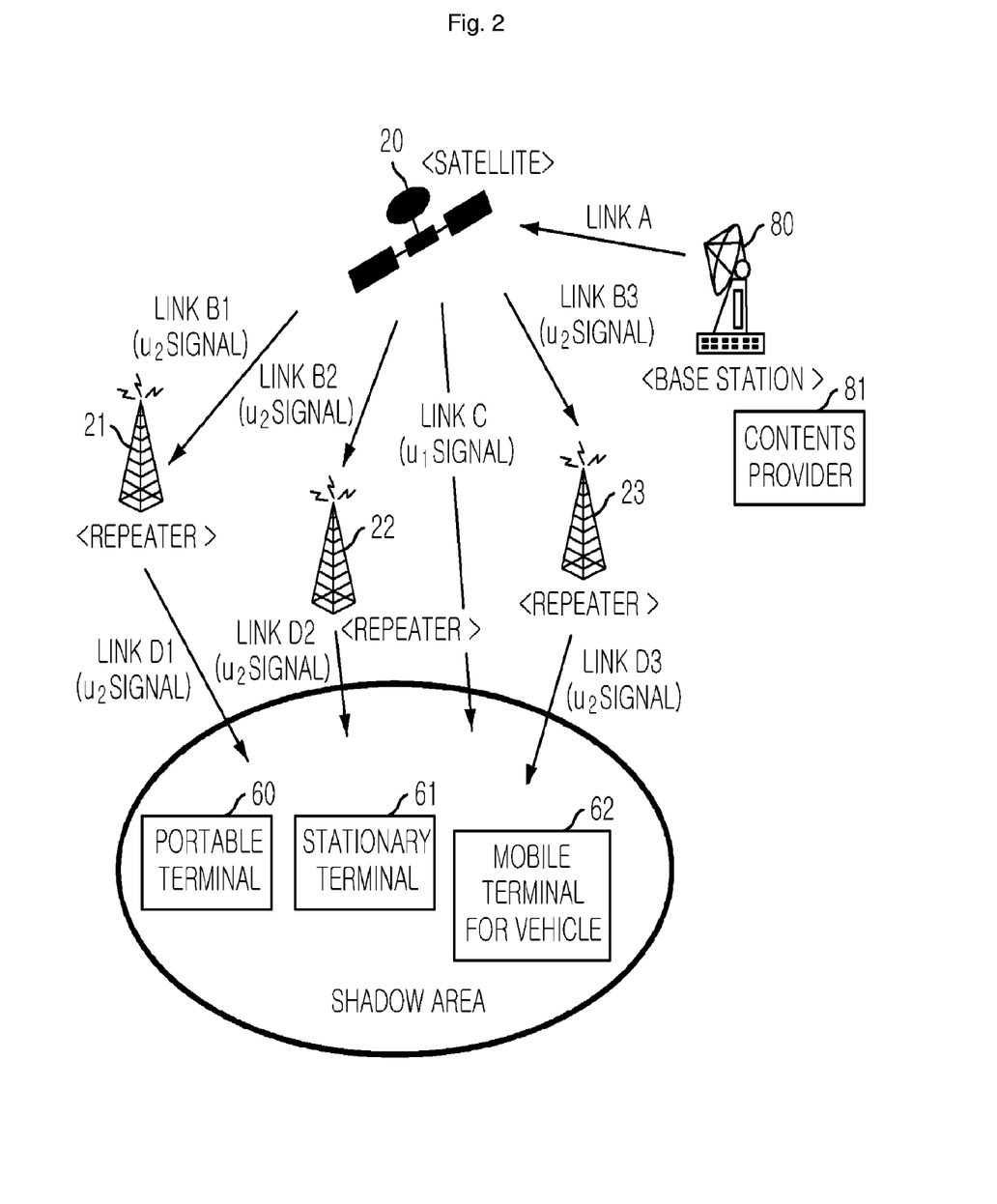
FIG. 2 is a diagram illustrating transmitting signals transmitted from a satellite and repeaters in accordance with an embodiment of the present invention when the transmission band of a link between a satellite and a portable terminal differs from that of a link between a satellite and a repeater.

FIG. 2 is a diagram illustrating transmitting signals transmitted from a satellite and repeaters in accordance with an embodiment of the present invention when the transmission band of a link between a satellite and a portable terminal differs from that of a link between a satellite and a repeater.

It assumes that a transmitter includes two transmitting antennas, a first antenna 1 and a second antenna 2. Also, the first antenna 1 transmits a STBC applied signal $u_1$ that is encoded to STBC, and the second antenna 2 transmits a STBC applied signal $u_2$.

The method of transmitting signals shown in FIG. 2 is the simplest transmission method. When a signal transmission band of a link C between a satellite 20 and a portable terminal 60 differs from that of links B1, B2, and B3 between a satellite and repeaters, that is, when a frequency transforming repeater is used, the satellite 20 transmits a signal $u_1$ with a band of link C, and the repeaters transmit a signal $u_2$ with a band of links D1, D2, and D3 by treating the satellite 20 as the first antenna 1, and the repeaters as the second antenna 2.

Accordingly, the portable terminal 60 receives the signal $u_1$ from the satellite 20 and the signal $u_2$ from the repeaters 21 to 23 at the same time, and estimates channels of two STBC-encoded signals using a pilot or a known estimation method. Then, the portable terminal 60 detects a corresponding signal by performing STBC decoding.

In the transmission method shown in FIG. 2, the satellite 20 encodes a signal $u_1$ loaded on the band of the link C, and encodes a signal $u_2$ loaded on the bands of the links B1, B2, and B3 by performing STBC encoding, and transmits the encoded signals $u_1$ and $u_2$. The portable terminal 60 can discriminate the signal $u_1$ and the signal $u_2$ through channel estimation and STBC decoding.

In the transmission method shown in FIG. 2, the repeaters 21 to 23 receive a signal $u_2$ from the satellite 20 through a band of a link between the repeater and the satellite, transform the received signal $u_2$ to a signal with different frequency band, and transmits the transformed signal $u_2$ to the portable terminal through a link formed between the repeater and the portable terminal 60. By the above scheme, temporal and spatial diversity gain can be obtained without increment of system cost and signal processing time because the load of processing signal does not increase in a satellite communication network. However, the transmission method shown in FIG. 2 cannot provide large diversity gain compared to a typical method when the link C is not formed as like an urban environment or the intensity of a transmitting signal is very weak.

Figure 3:
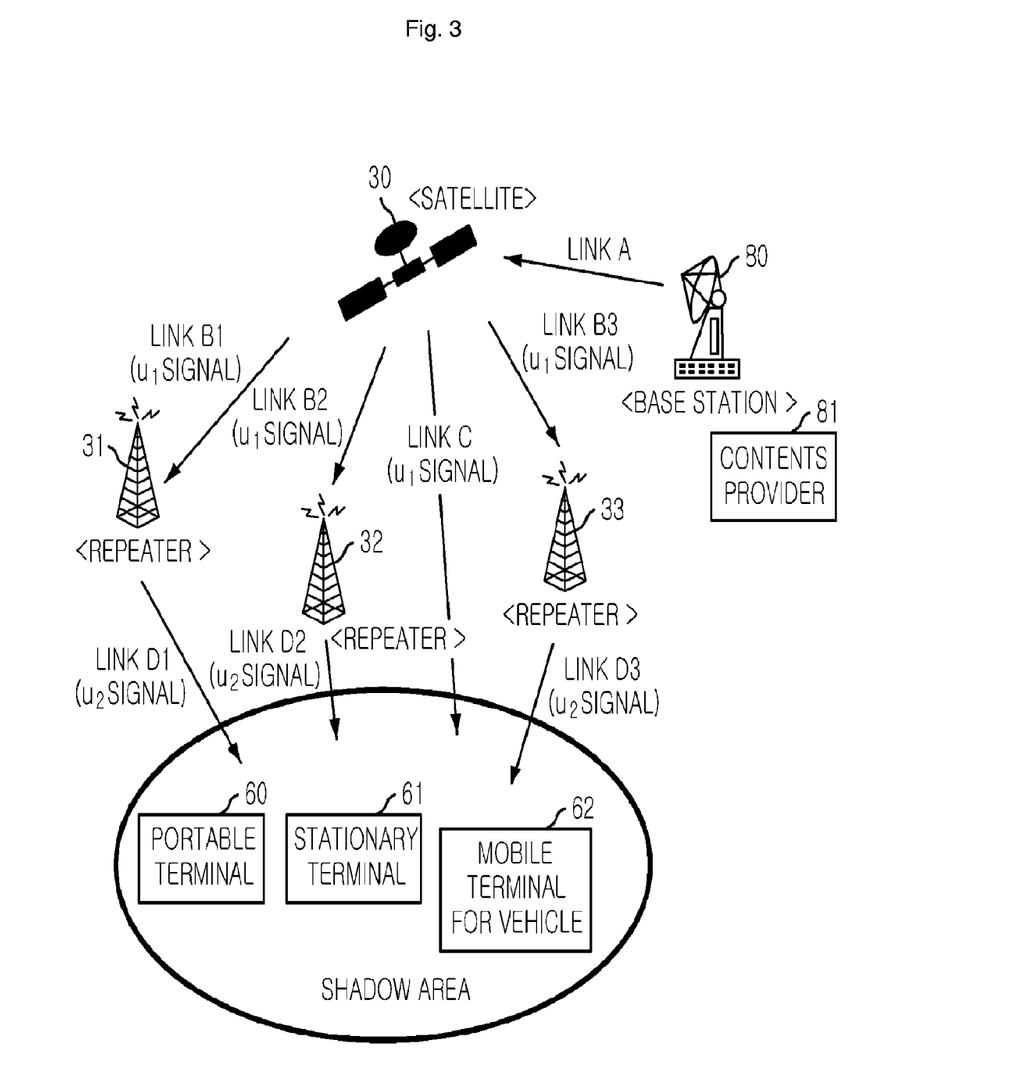
FIG. 3 is a diagram illustrating signals transmitted from a satellite and repeaters in accordance with an embodiment of the present invention when signal transmission bands of a link between a satellite and a portable terminal and a link between a satellite and a repeater are same.

FIG. 3 is a diagram illustrating signals transmitted from a satellite and repeaters in accordance with an embodiment of the present invention when signal transmission bands of a link between a satellite and a portable terminal and a link between a satellite and a repeater are same, that is, when a simple amplifying repeater is used.

It assumes that a transmitter includes two transmitting antennas, a first antenna 1 and a second antenna 2. Also, the first antenna 1 transmits a STBC applied signal $u_1$ that is encoded based on STBC, and the second antenna 2 transmits a STBC applied signal $u_2$.

In the transmission method shown in FIG. 3, the satellite 30 is also regarded as the first antenna and the repeaters 31 to 33 are regarded as the second antenna. However, since the transmission bands of the link C between the satellite 30 and the portable terminal 60 and the links B1, B2, and B3 are same, the satellite 30 transmits a signal u1 with the same band through the links B1, B2, B3, and C. The repeaters 31 to 33 receives the signal $u_1$ from the satellite 30, transform the received signal $u_1$ to a signal $u_2$ having the same frequency band, and transmit the transformed signal $u_2$ to the portable terminal through corresponding links D1, D2, and D3.

Herein, the portable terminal 60 receives the signal $u_1$ from the satellite 30 and the signals $u_2$ from the repeaters 31 to 33 at the same time, and detects a corresponding signal by performing the STBC decoding after discriminating two STBC encoded signals by performing channel estimation and STBC decoding.

In the signal transmission scheme shown in FIG. 3, the repeaters 31 to 33 transform the signal $u_1$ from the satellite 30 to the signal $u_2$ having the same frequency band, simply amplifying the transformed signal $u_2$, and relaying the amplified signal $u_2$ to the portable terminal 60. This signal transmission scheme may increase load due to signal processing in a satellite communication network. However, the repeaters 31 to 33 can be effectively managed because the repeaters 31 to 33 use the same method to process the signals.

Figure 4:
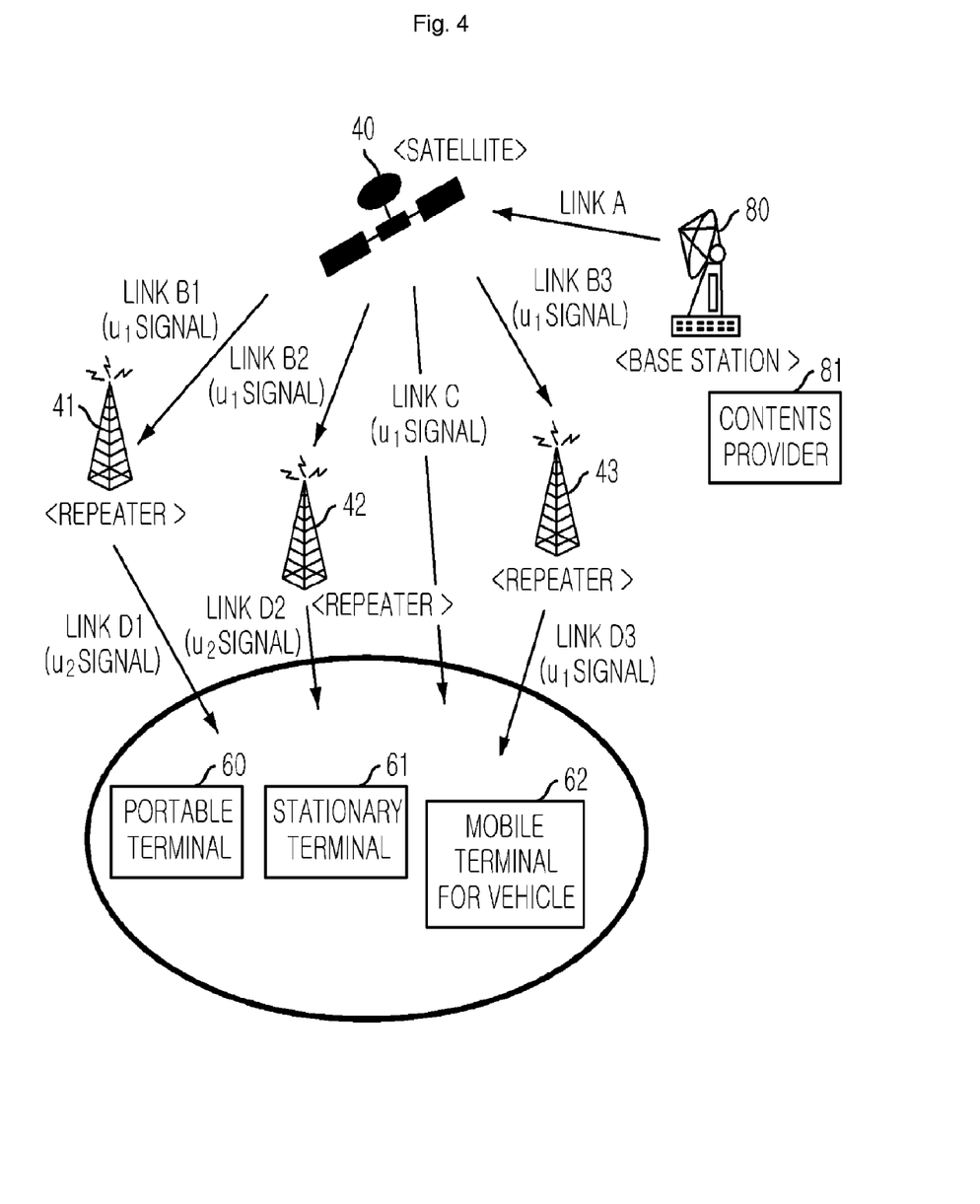
FIG. 4 is a diagram illustrating signals transmitted from a satellite and repeaters in accordance with an embodiment of the present invention for describing that a transmitting method according to the present embodiment can be applied to a satellite communication networks including a simple amplifying repeater and/or a frequency transform repeater.

FIG. 4 is a diagram illustrating signals transmitted from a satellite and repeaters in accordance with an embodiment of the present invention for describing that a transmitting method according to the present embodiment can be applied to a satellite communication networks including a simple amplifying repeater and/or a frequency transform repeater.

It assumes that a transmitter includes two transmitting antennas, a first antenna 1 and a second antenna 2. Also, the first antenna 1 transmits a STBC applied signal $u_1$ that is encoded based on STBC, and the second antenna 2 transmits a STBC applied signal $u_2$.

Referring to FIG. 4, a transmission method for a satellite communication network including a simple amplifying repeater will be described.

A satellite transmits STBC encoded signals through a band of a link formed between the satellite and a portable terminal and a band of a link formed between the satellite and repeaters. A predetermined simple amplifying repeater, for example, a first simple amplifying repeater, among the repeaters receives the signal $u_1$ from the satellite through the link formed to the satellite, amplifies the received signal $u_1$, and transmits the amplified signal $u_1$ to a portable terminal through a link formed to the portable terminal. The other simple amplifying repeaters, for example, a second simple amplifying repeater, receives the $u_1$ signal from the satellite through a link formed to the satellite, transforms the received signal $u_1$ to a signal $u_2$ having the same frequency band, amplifies the transformed signal $u_2$, and transmit the amplified signal $u_2$ to a portable terminal through a band of a link formed to the portable terminal.

Hereinafter, a transmission method for a satellite communication network including a frequency transforming repeater when the signal transmission bands of a link between a satellite and a portable terminal and a link between a satellite and a repeater are different.

A satellite transmits a STBC encoded signal $u_1$ through the band of a link formed to a portable terminal and transmits a STBC encoded signal $u_2$ to each repeater through the band of a link formed to each repeater. A predetermined repeater among the repeaters, for example, a first frequency transform repeater, receives the signal $u_2$ through the band of the link formed to the satellite, transforms the received signal $u_2$ to a signal $u_2$ having a frequency band corresponding to a link between the satellite and the portable terminal, and transmits the transformed signal $u_2$ through the and of the link formed to the portable terminal. The other frequency transform repeaters, for example, a second frequency transform repeater, receive the signal $u_2$ through the band of the link formed to the satellite, transform the received signal $u_2$ to a signal $u_1$ having a frequency band corresponding to the link formed between the satellite and the portable terminal, and transmit the transformed signal $u_1$ through the band of the link formed to the portable terminal.

In the transmission methods described with reference to FIG. 4, the satellite 40 and some repeaters, for example, a repeater 43 in FIG. 4, are regarded as the first antenna 1, and the other repeaters, for example, repeaters 41 and 42, are regarded as the second antenna 2.

For example, the satellite 40 transmits the same signal $u_1$ through the bands of links B1, B2, B3, and C. Some repeaters, for example, a repeater 43, receive the signal $u_1$ from the satellite 40, and transmit the received signal $u_1$ through the band of the link D3. Other repeaters receive the signal $u_1$ from the satellite 40 and transmit the received signal $u_2$ to the portable terminal through the bands of links D1 and D2.

Accordingly, the portable terminal 60 receives the signal $u_1$ from the satellite 40 and the repeater 43 and the signal $u_2$ from the repeaters 41 and 42 at the same time. Then, the portable terminal 60 discriminates two STBC encoded signals through channel estimation and STBC decoding and detects corresponding signals.

In the signal transmission method shown in FIG. 4, the repeater 43 having a simple amplifying function transmits the signal $u_1$ although the band of the link C is not formed as like the urban environment or although the transmission signal is too weak. Therefore, the portable terminal 60 can obtain large diversity gain although the portable terminal 60 is located at the urban environment.

Hereinafter, a method of detecting a corresponding signal through performing STBC decoding on signals received from satellite and from repeaters at a portable terminal will be described with reference to FIG. 5.

Figure 5:
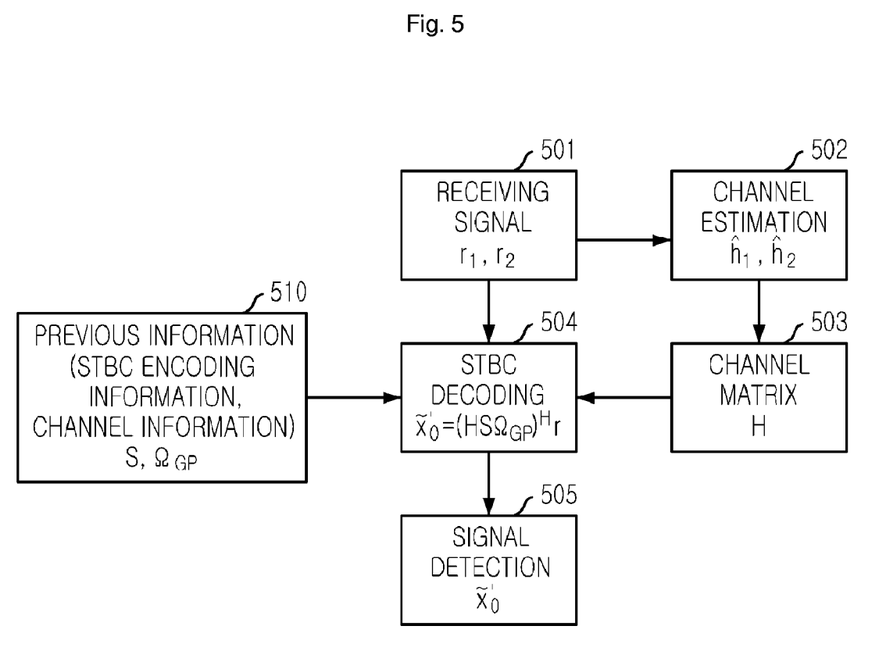
FIG. 5 is a flowchart illustrating a method of detecting a signal by performing STBC decoding on signals received from a satellite and repeaters at a portable terminal employing a WCDMA based IMT-2000 wireless interface specification in accordance with an embodiment of the present invention.

FIG. 5 is a flowchart illustrating a method of detecting a signal by performing STBC decoding on signals received from a satellite and repeaters at a portable terminal employing a WCDMA based IMT-2000 wireless interface specification in accordance with an embodiment of the present invention.

As shown in FIGS. 2 to 4, the satellite and the repeaters perform different transmission methods according to corresponding environments. However, a portable terminal simply processes the received signal without considering the transmission methods of the received signal.

That is, the portable terminal detects a signal by performing STBC decoding on a signal $r_1$ received through the band of a link C formed to the satellite and a signal $r_2$ received through the bands of links D1, D2, and D3 formed to the repeaters, and obtains diversity gain through temporal and spatial correlation.

A method of obtaining the diversity gain at the portable terminal is defined in the known 3GPP terrestrial WCDMA based IMT-2000 wireless interface specification. Therefore, the detailed description thereof is omitted. As shown in FIGS. 2 to 4, the terminal receives the signal u1 or the signal $u_2$ from the repeaters. Herein, a signal $r_2$ denotes a signal received from a repeater, and a signal $r_1$ denotes a signal received from a satellite.

In an embodiment of the present invention, an information series $$x_0 = \{x_0(m)\}$$

which is a signal transmitted from a transmitting end such as a satellite and a repeater is encoded into two streams by a STBC encoder. Herein, if output signals are defined as $$x_0^1 = x_0, x_0^2 = j_p x_0$$

for STBC of $$x_0^1 = [x_0, x_0^*]^T$$

having 2P samples, the two output signals can be expressed as following Eq. 1.

$$X_0 = \begin{bmatrix} x_0^1 \\ x_0^2 \end{bmatrix} = \begin{bmatrix} x_0 \\ J_P x_0^* \end{bmatrix} = \begin{bmatrix} I_P & 0 \\ 0 & J_P \end{bmatrix} \begin{bmatrix} x_0 \\ x_0^* \end{bmatrix} = \Omega_P x_0'$$ MathFigure 1 where $$\Omega_P = \begin{bmatrix} I_P & 0 \\ 0 & J_P \end{bmatrix}, J_P = I_P \otimes \begin{bmatrix} 0 & 1 \\ -1 & 0 \end{bmatrix}$$

In Eq. 1, $\otimes$ denotes a Kronecker Product.

In transmitting a signal by regarding a satellite and a repeater as two transmitting antenna as shown in FIGS. 2 to 4, a FIR filter $$h_{i,j}(n)$$

for L paths of a channel between a transmitting antenna i and a receiving antenna and a chip delay time $T_c$ as a tap delay time can be expressed as Eq. 2.

$$h_{i,1}(n) = \sum_{l=0}^{L-1} h_{i,1}^l(n)\delta(n-l)$$ MathFigure 2

As described above, a transmitting end encodes the information sequence as like Eq. 1 into two streams by performing the STBC encoding, and the STBC encoded streams are spread by a channelization code and scrambled by a scrambling code in order to distinguish a transmitting spot and a receiving spot. A signal $u_1$ transmitted from a link regarded as the $i^{th}$ transmitting antenna can be expressed as following Eq. 3.

$$u_i = \left\{ u_i(n) = b(n) \sum_{m=0}^{P-1} x_0^i(m) c(n-Gm) \right\}$$ MathFigure 3

In Eq. 3, b(n) denotes a long complex scrambling code to identify a transmitting spot and a receiving spot, and c(n) denotes a channelization code having a length G.

In Eq. 3, if $S^G$ is defined as a channelization code and a (G×1) vector having a complex scrambling code value, a channel sign matrix S can be expressed as $S=\text{diag}(S^G)$, and a signal u transmitted through two streams using Eq. 1 can be expressed as following Eq. 4.

$$u = \begin{bmatrix} u_1 \\ u_2 \end{bmatrix} = S\Omega_P x_0'$$ MathFigure 4

Using a channel model between a transmitting antenna and a receiving antenna, a channel matrix $H_1^i(GP \times GP)$ can be expressed as a toeplitz matrix as like Eq. 5.

$$H_1^i = \begin{bmatrix} h_{i,1}^0(0) & 0 & \Lambda & \Lambda & 0 \\ M & h_{i,1}^0(1) & & & M \\ h_{i,1}^{L-1}(0) & M & O & & M \\ M & h_{i,1}^{L-1}(1) & & O & M \\ 0 & M & \Lambda & & h_{i,1}^0(GP) \end{bmatrix}$$ MathFigure 5

A vector for a receiving signal received in one block unit at a terminal through Eq. 1 to Eq. 5 can be expressed as Eq. 6.

$$r = \begin{bmatrix} r_1 \\ r_2 \end{bmatrix} = \underbrace{[H_1^1 \; H_1^2]}_{=H} \underbrace{\begin{bmatrix} u_1 \\ u_2 \end{bmatrix}}_{=u} + n$$ MathFigure 6

The terminal detects a transmitting signal $\tilde{x}_0'$ by performing STCB decoding like Eq. 7 based on the receiving signal of Eq. 6 and a channel matrix H through channel estimation like Eq. 5 as shown in steps S501, S502, S503, S504, and S505 in FIG. 5.

$$\tilde{x}_0' = (H S \Omega_{GP})^H r$$ MathFigure 7

In order to perform the STBC decoding to detect a signal at the step S504, a terminal must know information about STBC encoding performed in a transmitting end such as a satellite or a repeater. Also, the terminal must know information about a channel between the transmitting end and a receiving end such as the terminal for obtaining a channel matrix at the step S503. It is preferable to exchange the channel information and the STBC encoding information between the transmitting end and the receiving end at step S510.

Figure 6:
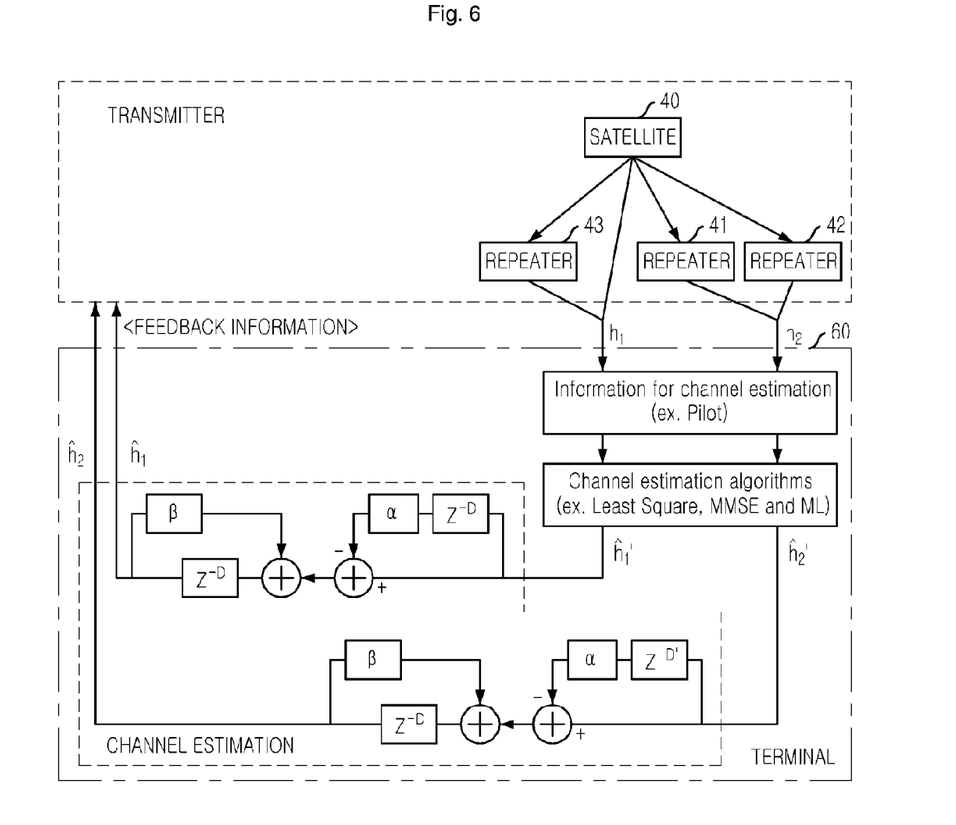
FIG. 6 is a block diagram for describing channel estimation at a terminal in accordance with an embodiment of the present invention.

FIG. 6 is a block diagram for describing channel estimation at a terminal in accordance with an embodiment of the present invention.

In order to deeply understand the channel estimation proposed in the present invention, the signal transmission method at the satellite and the repeater shown in FIG. 4 is illustrated with the channel estimation thereof in FIG. 6.

As shown in FIG. 6, a satellite 40 transmits the same signal $u_1$ using the band of links B1, B2, B3, and C. A repeater 43 receives the signal $u_1$, simply amplifies the received signal $u_1$, and transmits the amplified signal $u_1$ using the band of the link D3. The other repeaters 41 and 42 receive the signal $u_1$ from the satellite 40, transform the received signal $u_1$ to a signal $u_2$ in frequency, and transmit the signal $u_2$ using the bands of links D1 and D2.

The terminal performs channel estimation that compensates a channel through the channel estimation information. The channel estimation may be performed at a terminal or a transmitting end. FIG. 6 shows the channel estimation procedure performed in the terminal. Since the performance of channel estimation greatly influences the STBC, channel estimation, compensation, and prediction algorithms of FIG. 6 are introduced.

That is, the terminal estimates channel information of a path related to the signals $u_1$ and $u_2$ using a pilot symbol which is previously received from a transmitting end as channel estimation information and well-known algorithms such as MMSE, Least square, and ML.

These channel estimation methods, however, are developed for a terrestrial mobile communication network. Since the signals have a long round trip delay time between a transmitter and a receiver, if these channel estimation methods are used in the terminal according to the present invention, the performance thereof becomes seriously degraded due to the channel estimation error caused by the long delay time.

In an exemplary embodiment of the present invention, a channel estimation scheme that compensates the round-trip delay time for applying STBC into a satellite communication network is proposed, and will be described with reference FIG. 6.

In an exemplary embodiment of the present invention, a terminal estimates a channel estimation value of a next time point of receiving a signal using a channel estimation value before a long round-trip delay time and a channel estimation value of a current time point of receiving a signal, where the channel estimation value before the long round-trip delay time is the channel estimation value of a previous time point of receiving a STBC encoded signal. After estimating, the terminal transmits the channel estimation value to a transmitting end such as a satellite or a repeater, preferably, a satellite.

That is, the terminal estimates the channel information value for a receiving signal as follows. The terminal calculates a first compensation value by obtaining a channel estimation value using a conventional channel estimation method, delaying the obtained channel estimation value as much as D' applying a coefficient $\alpha$ to the delayed channel estimation value, and subtracting the result thereof from the obtained channel estimation value. Then, the terminal calculates a second compensation value by delaying the first compensation value as much as D and applying a coefficient $\beta$ into the delayed compensation value. Afterward, the first compensation value and the second compensation value are added to estimate the channel information value for the receiving signal. Such a channel estimation scheme is performed on each of received signals $u_1$ and $u_2$.

Especially, if $\alpha$, $\beta$, D and D' are set up as 0, it is equivalent to a conventional channel compensation scheme. In an exemplary embodiment of the present invention, D and D' are setup with very small values, and $\alpha$ and $\beta$ are setup with proper values. Then, the terminal can accurately estimate channel information through channel information correlation to previous time.

In an exemplary embodiment of the present invention, a channel estimation scheme may be performed in a transmitting end. That is, the transmitting end previously compensates a channel before transmitting a signal to a terminal as follows.

A terminal estimates channel information of a received signal uses a pilot symbol or a conventional channel estimation scheme, and feeds the estimated channel information back to the transmitting end. The transmitting end calculates a first compensation value by delaying the received channel estimation value as long as D' applying a coefficient $\alpha$ to the delayed channel estimation value, and subtracting the result from the received channel estimation value. Then, the transmitting end calculates a second compensation value by delaying the first compensation value as long as D and applying a coefficient into the delayed compensation value. Afterward, the first compensation value and the second compensation value are added to estimate the channel information value for the transmitting signal. Such a channel estimation scheme is performed on each of transmitting signals $u_1$ and $u_2$. The channel estimation scheme for the transmitting end is identical to that for the terminal. By performing the channel estimation scheme according to an exemplary embodiment of the present invention at the transmitting end, the load of the terminal for the channel estimation can be reduced.

The channel estimation scheme according to an exemplary embodiment of the present invention can be effectively used even in an environment in which a transmitting end cannot compensate a channel because a channel of a receiving end quickly changes, for example, when the terminal is traveling in very high speed in a terrestrial mobile communication network.

Although the present invention is described using STBC as an example in the exemplary embodiments of the present invention shown in FIGS. 1 to 6, it is obvious to those skilled in the art that the present invention can be applied to any satellite communication system including repeaters, and multiple input and multiple output (MIMO) system, and any temporal and spatial code used to obtain temporal and spatial diversity gain can be used.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2006-0091983, filed in the Korean Intellectual Property Office on Sep. 21, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A satellite communication system for obtaining a diversity gain by transmitting a signal applied with a space and time block code (STBC) when a signal transmission frequency band of a link between a satellite and a terminal differs from a signal transmission frequency band of a link between a satellite and a repeater, comprising:
    the satellite for transmitting a first signal encoded to STBC using the band of the link formed between the satellite to the terminal and at a same time transmitting a second signal encoded to STBC using the frequency band of the link formed between the satellite to the repeater; and
    at least one of frequency transforming repeaters for receiving the second signal through the band of the link formed between the satellite to the repeater, transforming the received second signal to a signal with other frequency band, and transmitting the transformed second signal using a band of a link formed to the terminal allowing the terminal to regard the satellite and the repeater as two transmitting antennas transmitting signals encoded to STBC.

2. The satellite communication system as recited in claim 1, wherein the terminal distinguishes a signal received from a satellite from a signal received from a repeater, and detects a corresponding signal through performing STBC decoding.

3. The satellite communication system as recited in claim 1, wherein the terminal estimates a channel estimation value of a next time point of receiving a signal using a channel estimation value of a previous time point of receiving a signal from a satellite and a repeater and another channel estimation value of a current time point of receiving a signal, and feeds the estimated channel estimation value back to the satellite or the repeater.

4. A satellite communication system for obtaining a diversity gain by transmitting a signal applied with a space and time block code (STBC) when a signal transmission band of a link between a satellite and a terminal is identical to that of a link between the satellite and a repeater, comprising:
    the satellite for transmitting a first signal encoded to STBC using a band of a link formed between the satellite to the terminal and at a same time using a frequency band of a link formed between the satellite to each repeater and that differs from that a signal transmission frequency band of a link between the satellite and the repeater, respectively; and at least one of simple amplifying repeaters for receiving the first signal through the band of the link formed between the satellite and the repeater, transforming the received first signal to a second signal having the same frequency band of the first signal, and transmitting the transformed second signal using a band of a link formed to the terminal allowing the terminal to regard the satellite and the repeater as two transmitting antennas transmitting signals encoded to STBC.

5. The satellite communication system as recited in claim 4, wherein the terminal distinguishes a signal received from a satellite from a signal received from a repeater, and detects a corresponding signal through performing STBC decoding.

6. The satellite communication system as recited in claim 4, wherein the terminal estimates a channel estimation value of a next time point of receiving a signal using a channel estimation value of a previous time point of receiving a signal from a satellite and a repeater and another channel estimation value of a current time point of receiving a signal, and feeds the estimated channel estimation value back to the satellite or the repeater.

7. A satellite communication system for obtaining a diversity gain by transmitting a signal applied with a space and time block code (STBC) when a satellite communication network include repeaters having a simple amplifying function, comprising:
  a satellite for transmitting a first signal encoded to STBC using a band of a link formed between the satellite to a terminal and at a same time using a frequency band of a link formed between the satellite to each repeater and that differs from that a signal transmission frequency band of a link between a satellite and a repeater, respectively;
  at least one of first simple amplifying repeaters for receiving the first signal through the band of the link formed to the satellite, amplifying the received first signal, and transmitting the amplified first signal using a band of a link formed to a terminal; and
  at least one of second simple amplifying repeater for receiving the first signal through the band of the link formed to the satellite, transforming the first signal to a second signal having the same frequency band of the first signal, amplifying the transformed second signal, and transmitting the amplified second signal using a band of a link formed to a terminal allowing the terminal to regard the satellite and the repeater as two transmitting antennas transmitting signals encoded to STBC.

8. The satellite communication system as recited in claim 7, wherein the terminal distinguishes a signal received from a satellite from a signal received from a repeater, and detects a corresponding signal through performing STBC decoding.

9. The satellite communication system as recited in claim 7, wherein the terminal estimates a channel estimation value of a next time point of receiving a signal using a channel estimation value of a previous time point of receiving a signal from a satellite and a repeater and another channel estimation value of a current time point of receiving a signal, and feeds the estimated channel estimation value back to the satellite or the repeater.

10. A satellite communication system for obtaining a diversity gain by transmitting a signal applied with a space and time block code (STBC) when a satellite communication network include repeaters having a frequency transforming function and a signal transmission band of a link between a satellite and a terminal differs from that of a link between the satellite and a repeater, comprising:
  the satellite for transmitting a first signal encoded to STBC using a band of a link between the satellite to the terminal and at a same time transmitting a second signal that is encoded to STBC using a frequency band of a link formed between the satellite to the repeater and that differs from that a signal transmission frequency band of a link between the satellite and the terminal;
  at least one of first frequency transforming repeaters for receiving the second signal through the band of the link to the satellite, transforming the received second signal to a second signal having a frequency band corresponding to the link between the satellite and a terminal, and transmitting the transformed second signal using a band of a link formed to the terminal; and
  at least one of second frequency transforming repeater for receiving the second signal through the band of the link formed to the satellite, transforming the received second signal to a first signal having a frequency band corresponding to a link between the satellite and the terminal, and transmitting the transformed first signal using a band of a link formed to the terminal allowing the terminal to regard the satellite and the repeater as two transmitting antennas transmitting signals encoded to STBC.

11. The satellite communication system as recited in claim 10, wherein the terminal distinguishes a signal received from a satellite from a signal received from a repeater, and detects a corresponding signal through performing STBC decoding.

12. The satellite communication system as recited in claim 10, wherein the terminal estimates a channel estimation value of a next time point of receiving a signal using a channel estimation value of a previous time point of receiving a signal from a satellite and a repeater and another channel estimation value of a current time point of receiving a signal, and feeds the estimated channel estimation value back to the satellite or the repeater.

13. A method for detecting a signal in a terminal in a satellite communication system for obtaining a diversity gain by transmitting a signal applied with space time block code (STBC) from a satellite and a repeater to the terminal, the method comprising the steps of:
  estimating channel information corresponding to each received signal when receiving a signal encoded to STBC from the satellite and the repeater at the same time;
  generating a channel matrix using the estimated channel information; and
  detecting a transmitting signal by performing STBC decoding on the received signal based on STBC encoding information previously received from the satellite and the repeater and the generated channel matrix using a frequency band of a link formed between the satellite to the repeater and that differs from that a signal transmission frequency band of a link between the satellite and the terminal allowing the terminal to regard the satellite and the repeater as two transmitting antennas transmitting signals encoded to STBC.

14. A method for estimating a channel in a terminal in a satellite communication system for obtaining a diversity gain by transmitting a signal applied with space time block code (STBC) from a satellite and a repeater to the terminal, the method comprising the steps of:
  estimating channel information value by performing a predetermined channel estimation scheme on signals received from the satellite and the repeater at a same time;

delaying the estimated channel information value as much as D', applying to the delayed channel information value, and subtracting the result of applying the coefficient α from the estimated channel information value; and delaying the subtracted channel information value as much as D, applying to the delayed channel information value, and adding the result of applying the coefficient β to the subtracted channel information value using a frequency band of a link formed between the satellite to the repeater and that differs from that a signal transmission frequency band of a link between the satellite and the terminal allowing the terminal to regard the satellite and the repeater as two transmitting antennas transmitting signals encoded to STBC.

\* \* \* \* \*